H. W. ALDEN.
DRIVING AXLE.
APPLICATION FILED JUNE 29, 1912.
1,049,637.
Patented Jan. 7, 1913.
2 SHEETS—SHEET 1.
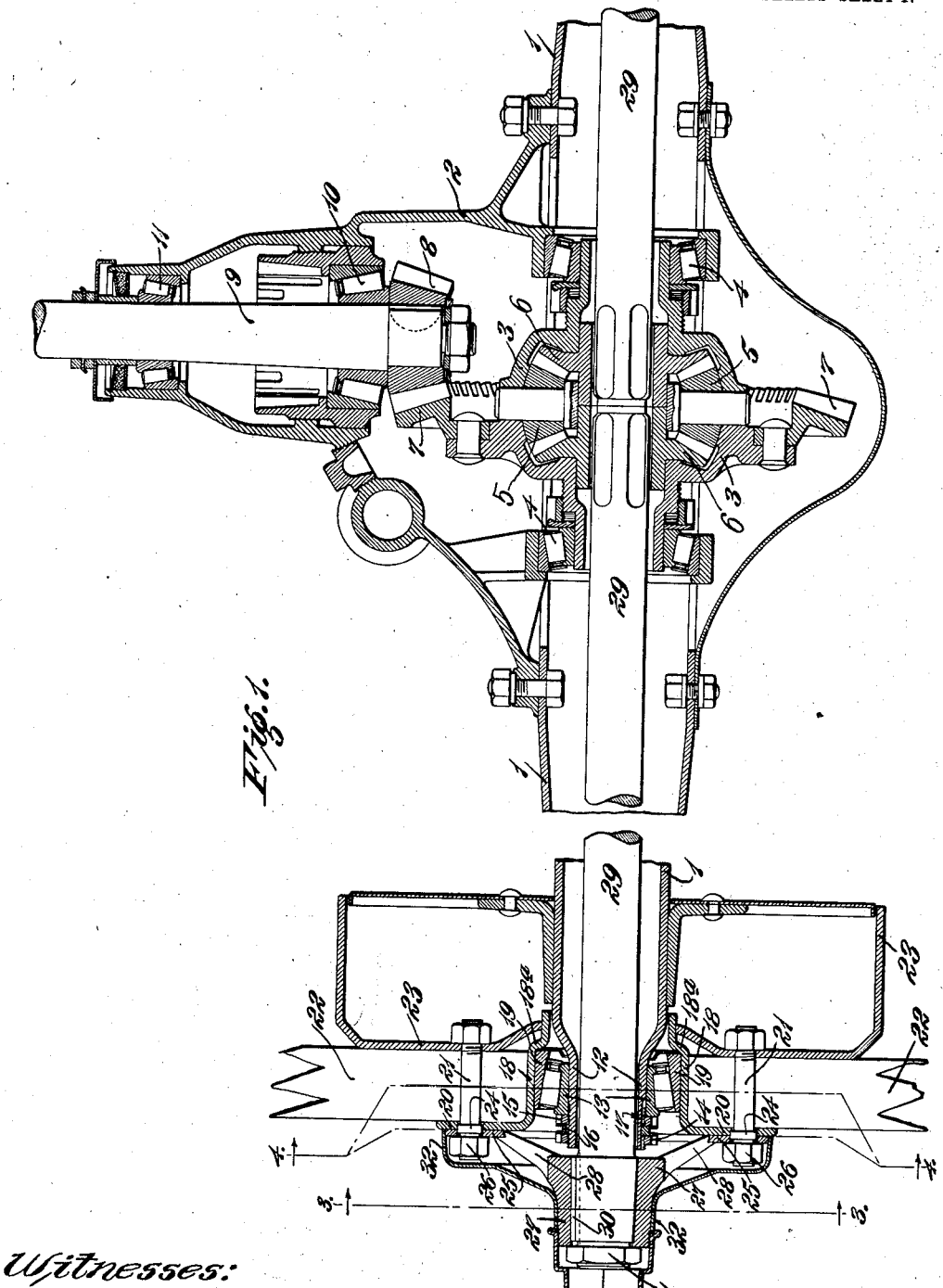
Witnesses:
Edgar S. Farmer.
G. A. Pennington
Inventor:
Herbert W. Alden,
By Court
his Attys.

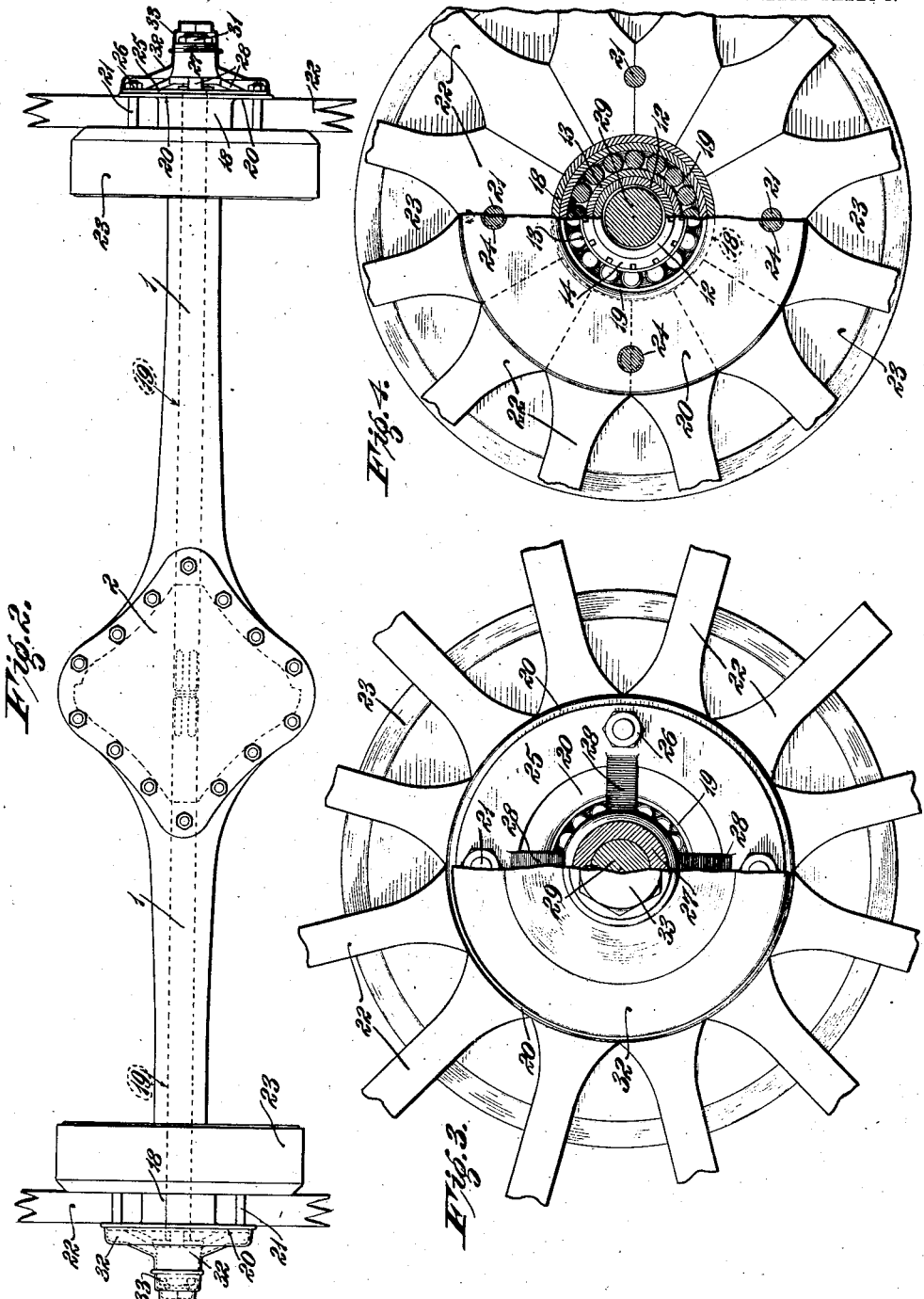

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

DRIVING-AXLE.

1,049,637.  Specification of Letters Patent.  Patented Jan. 7, 1913.

Application filed June 29, 1912. Serial No. 706,650.

*To all whom it may concern:*

Be it known that I, HERBERT W. ALDEN, a citizen of the United States, and a resident of the city of Detroit, in the county of Wayne and State of Michigan, have invented a new and useful Improvement in Driving-Axles, of which the following is a specification.

This invention relates to driving axles for motor vehicles and the like.

It has for its principal objects to produce an axle structure of the floating type employing but a single roller bearing of the tapered roller type under each wheel in lieu of the double bearings usually employed without sacrificing any material advantage; to facilitate the adjustment of the bearings for the initial set up and for subsequent wear; and to attain certain advantages which will hereinafter more fully appear.

The invention consists in the parts and in the arrangements and combinations of parts hereinafter described and claimed.

In the accompanying drawings which form part of this specification and wherein like symbols refer to like parts wherever they occur,—Figure 1 is a fragmentary longitudinal section through the outer end portion of a driving axle and the portion in the region of the differential mechanism, illustrating an adaptation of the invention; Fig. 2 is an elevation of the entire axle with the hub portions of the wheels assembled thereon; Fig. 3 is a fragmentary end view partly in section on the line 3—3 of Fig. 1; and Fig. 4 is a view partly in section and partly in elevation on the line 4—4 of Fig. 1.

The axle shown in the drawings comprises a tubular casing 1 whose middle portion is enlarged and has secured thereto a supporting casing 2 for the differential mechanism. The differential mechanism comprises a housing 3 which is mounted on antifriction bearings 4. In this housing are journaled the differential pinions 5 and gears 6. Fixed on the housing is a bevel driving gear 7 which meshes with a pinion 8 on the propeller shaft 9, which latter is mounted on the antifriction bearings 10 and 11. The outer end portions of the tubular casing 1 are reduced, as at 12, and have sleeved thereon the inner bearing rings or cones 13 of the antifriction bearings for the wheel hubs. The outer extremities of the reduced end portions of the axle are screw-threaded to receive adjusting nuts 14 and 15 which coöperate with said bearing rings or cones 13. Interposed between said nuts is a washer 16 having a feather-key or projection adapted to slide in a groove 17 in the tube whereby said washer is held against rotation, but is permitted movement endwise on the tube to permit of the adjustment of the bearing as will hereinafter more fully appear.

The wheel hub comprises a cylindrical central portion 18 in which is seated the outer ring 19 of the antifriction bearing, said ring abutting at its inner end against the shoulder $18^a$ formed by contracting the inner end portion of the hub. The hub 18 is provided with an annular plate or flange 20 at its outer end having a series of countersunk perforations through which securing bolts 21 are passed to clamp the spokes 22 of the wheel between said flange 20 and brake drum plate 23. The bolts 21 have collars 24 which are seated in the countersunk perforations in said flange 20 and project a slight distance beyond the outer face of said flange so as to fit in perforations in a ring or plate 25 which is clamped by nuts 26 on the outer end portions of said bolts 21. The plate 25 is preferably made integral with a central hub or socket member 27, the connection between said plate and socket member being either a solid web having an opening or openings therein, or, as shown, a series of spider legs 28, so that access may be had to the adjusting nuts 14 and 15 of the bearing. The hub portion 27 is provided with a tapered axial seat in which the counterpart outer end portion of the shaft section 29 is fastened as by a key 30 and a securing nut 31 on the reduced extremity of the shaft section.

In order to keep out dust and dirt a cap or shield 32 is provided to cover the open spider. This cap as shown is held in place by the protecting cap 33 which is screwed onto the hub member 27 to guard the nut 31. Obviously, however, in cases where a perforated web is provided in lieu of the spider, the perforation may be closed by a removable plug.

The inner ends of the shaft sections 29 are mounted in the hubs of the differential gears 6 and abut against each other so as to transmit the end thrust from one wheel bearing to the other; and said inner end portions of the shaft sections 29 may have a feather-key connection with the hubs of said differential gears 6 or the coöperating parts may have polygonal faces so that the gears and shaft sections are fixed to rotate together but are permitted independent endwise movement. By this arrangement the differential mechanism can be adjusted without affecting the working of the shaft sections and the end thrust of the shaft sections is not transmitted to the bearings of said differential mechanism.

By placing the bearings in the wheel hubs so that the smaller ends of the rollers and the inner ring or cone are disposed inward, the outer ring has, of course, to flare outward. Consequently, the side thrust of the wheels outward is taken by the bearings and resisted by the adjusting nuts 14, 15. The side thrust of the wheels inward is transmitted through the abutting shaft sections to the bearing for the opposite wheel. The bearing may also be placed medially with respect to the tread of the wheel so that the full benefit of its efficiency is obtained. By this arrangement, also, the initial "set up" or adjustment may be readily effected by manipulating the adjusting nuts 14, 15, and any subsequent wear can be as readily taken up by merely removing the cap or cover without making it necessary to dismantle any other parts of the axle structure.

Obviously, the axle structure admits of considerable modification without departing from the invention. Therefore, I do not wish to be limited to the specific construction and arrangement shown.

What I claim is:

1. The combination with a hollow axle, of wheels journaled on antifriction bearings on the end portions of said axle, said bearings being adapted to take the side thrust of the respective wheels outward but permit movement of the wheels inward, and a driving shaft extending through said axle and fixedly connected at its ends to the respective wheels so that the side thrust of one wheel inward is transmitted to and taken by the bearing of the opposite wheel.

2. The combination with a hollow axle, of wheels journaled on antifriction bearings on the end portions of said axle, said bearings being adapted to take the side thrust of the respective wheels outward, a differential driving gear mounted within said axle, and a divided driving shaft extending through said axle, the inner ends of said shaft sections abutting and the adjacent portions having a sliding key connection with said differential driving gear, and the outer end portions of said shaft sections being fixedly connected to the respective wheels so that the side thrust of one wheel inward is transmitted to and taken by the bearing of the opposite wheel.

3. The combination with a hollow axle, of wheels journaled on the end portions of said axle, each wheel being provided with a single antifriction journal bearing adapted to take the side thrust of the wheel outward, and a divided driving shaft extending through said axle, the inner ends of said driving shaft sections abutting and the outer end portions being fixedly connected to the respective wheels so that the side thrust of one wheel inward is transmitted to and taken by the bearing of the opposite wheel.

4. The combination with a hollow axle, of wheels journaled on the end portions of said axle, each wheel being provided with an antifriction bearing including a single annular series of tapered rollers whose smaller ends are disposed inward, a correspondingly tapered hub bearing ring and axle cone, and an adjustable stop on the axle coöperating with said axle cone to resist movement of the latter outward, and a divided driving shaft extending through said axle, the inner ends of the shaft sections abutting and their outer end portions being fixedly connected to the respective wheels.

5. The combination with a hollow axle, of wheels journaled on the end portions of said axle and each having an antifriction journal bearing adapted to take the side thrust of the wheel outward only, including an inner bearing sleeve movable longitudinally on the axle and means for adjusting said sleeve and limiting its position outward, a divided driving shaft extending through said axle, the inner ends of said shaft sections abutting, and means connecting the outer ends of the shaft sections to the respective wheels, said connecting means including a member having its marginal portion secured rigidly to the wheel in the region of the hub thereof and its central portion fixed to the end portion of the coöperating shaft section, said member having an opening in the region of the journal bearing of the wheel.

6. The combination with a hollow axle, of wheels journaled on the end portions of said axle and each having an antifriction journal bearing adapted to take the side thrust of the wheel outward only, including a single annular series of tapered rollers whose smaller ends are disposed inward, a tapered bearing ring fitted in the wheel hub with its smaller opening inward, a correspondingly tapered bearing cone sleeved on the axle, the adjacent outer portion of the axle being screw-threaded, and an adjusting and stop nut or nuts screwed onto said axle in coöperative relation to the outer end of said cone, a divided driving shaft extending through said axle, the inner ends of said shaft sections abutting, and means connecting the outer ends of the shaft sections to the respective wheels, said connecting means including a member having its marginal portion secured rigidly to the wheel in the region of the hub thereof and its central portion fixed to the end portion of the coöperating shaft section, said member having an opening in the region of the journal bearing of the wheel.

Signed at Detroit, Michigan, this 25th day of June, 1912.

HERBERT W. ALDEN.

Witnesses:
LEWIS R. JUDSON,
LESLIE WILLIAMS.